(12) United States Patent
Yen et al.

(10) Patent No.: US 12,199,381 B2
(45) Date of Patent: Jan. 14, 2025

(54) CONNECTOR ASSEMBLY

(71) Applicant: Molex, LLC, Lisle, IL (US)

(72) Inventors: Sheng-Ping Yen, New Taipei (TW); Chun-Hsiang Chiang, New Taipei (TW)

(73) Assignee: Molex, LLC, Lisle, IL (US)

( * ) Notice: Subject to any disclaimer, the term of this patent is extended or adjusted under 35 U.S.C. 154(b) by 344 days.

(21) Appl. No.: 17/847,171

(22) Filed: Jun. 23, 2022

(65) Prior Publication Data

US 2022/0416477 A1    Dec. 29, 2022

(30) Foreign Application Priority Data

Jun. 29, 2021   (CN) .......................... 202110725419.3

(51) Int. Cl.
*H01R 13/6582*   (2011.01)
*G02B 6/42*   (2006.01)
*H01R 13/514*   (2006.01)
*H01R 13/518*   (2006.01)

(52) U.S. Cl.
CPC ....... *H01R 13/6582* (2013.01); *G02B 6/4284* (2013.01); *H01R 13/514* (2013.01); *H01R 13/518* (2013.01)

(58) Field of Classification Search
None
See application file for complete search history.

(56) References Cited

U.S. PATENT DOCUMENTS

| 7,601,021 | B1* | 10/2009 | Yang .................... G02B 6/4261 |
| | | | 439/487 |
| 7,712,941 | B2* | 5/2010 | Tai ...................... H01R 13/6658 |
| | | | 439/490 |
| 8,206,019 | B2* | 6/2012 | Chen ...................... H01R 24/64 |
| | | | 439/490 |
| 8,684,765 | B2 | 4/2014 | Shirk et al. |
| 9,350,108 | B2* | 5/2016 | Long .................... H01R 13/717 |
| 9,787,034 | B2* | 10/2017 | Yang .................... G02B 6/0008 |
| 9,933,555 | B2* | 4/2018 | Henry .................... G02B 6/008 |
| 10,069,248 | B2* | 9/2018 | Su ........................ G02B 6/4284 |
| 2009/0258534 | A1 | 10/2009 | Bright et al. |

(Continued)

FOREIGN PATENT DOCUMENTS

| CN | 204166166 U | 2/2015 |
| CN | 110364871 A | 10/2019 |

(Continued)

*Primary Examiner* — Tho D Ta (57) ABSTRACT

A connector assembly is provided and includes a shielding cage, a receptacle connector and a light guiding member. The shielding cage has a plurality of walls, a receiving space defined together by the plurality of walls, a front end opening communicated to the receiving space and an aperture communicated to the receiving space. The receptacle connector is received in a rear segment of the receiving space of the shielding cage. The light guiding member has at least two light guiding pipes, each light guiding pipe has a first segment positioned to the front and a second segment positioned to the rear. The first segments of the two light guiding pipes are positioned outside the shielding cage and the second segments of the two light guiding pipes pass through the aperture and enter into the rear segment of the receiving space of the shielding cage.

20 Claims, 11 Drawing Sheets

(56) References Cited

U.S. PATENT DOCUMENTS

| | | | | |
|---|---|---|---|---|
| 2020/0049912 A1* | 2/2020 | Lu | ........................ | G02B 6/4269 |
| 2020/0366035 A1* | 11/2020 | Wu | ...................... | H01R 13/518 |

FOREIGN PATENT DOCUMENTS

| | | | |
|---|---|---|---|
| CN | 111342283 A | 6/2020 |
| CN | 211348753 U | 8/2020 |
| JP | 2004070241 A | 3/2004 |

* cited by examiner

CONNECTOR ASSEMBLY

RELATED APPLICATIONS

This application claims priority to Chinese Patent Application No. 202110725419.3 filed on Jun. 29, 2021, which is incorporated herein by reference in its entirety.

TECHNICAL FIELD

The present disclosure relates to a connector assembly, and particularly relates to a connector assembly which has a light guiding member.

BACKGROUND ART

Chinese utility model patent application issued publication No. CN204166166U discloses a connector assembly having positioning pieces that extend and bend from a top portion of a metal shell of the connector assembly, wherein an upper end portion of the positioning piece is provided with a snapping groove, light guiding pipes are provided with positioning posts corresponding to the snapping grooves in position respectively, when the light guiding pipes are assembled to a top portion of a heat sink, each positioning post is snapped into the corresponding snapping groove. However, rear segments of the light guiding pipes disclosed in this patent document are positioned outside a rear end of the metal shell, which will increase a space occupied by the whole connector assembly on a board. The light guiding pipes are arranged along two sides and are not blocked therebetween, light beams at tip ends of the light guiding pipes are close to light sources which will interfere with each other.

SUMMARY

Therefore, one object of the present disclosure is to provide a connector assembly which can improve at least one deficiency of the prior art.

Accordingly, in some embodiments, a connector assembly of the present disclosure comprises a shielding cage, a receptacle connector and a light guiding member. The shielding cage has a plurality of walls, a receiving space defined together by the plurality of walls, a front end opening communicated to the receiving space and an aperture communicated to the receiving space. The receptacle connector is received in a rear segment of the receiving space of the shielding cage. The light guiding member has at least two light guiding pipes, each light guiding pipe has a first segment positioned to the front and a second segment positioned to the rear, the first segments of the two light guiding pipes are positioned outside the shielding cage, the second segments of the two light guiding pipes pass through the aperture and enter into the rear segment of the receiving space of the shielding cage.

In some embodiments, the first segment of each light guiding pipe extends from the front to the rear, each light guiding pipe of the second segment extends from the top to the bottom, the plurality of walls of the shielding cage comprises a top wall, the aperture is formed to a rear end of the top wall, the first segments of the two light guiding pipes are positioned above the top wall of the shielding cage close to two sides of the top wall, the second segments of the two light guiding pipes pass through the aperture in the top wall and enter into the rear segment of the receiving space of the shielding cage.

In some embodiments, the plurality of walls of the shielding cage comprise a rear wall, the second segments of the two light guiding pipes are assembled to the rear wall.

In some embodiments, the second segment of each light guiding pipe has a snapping block, the rear wall has snapping apertures which correspondingly cooperate with the snapping blocks of the two light guiding pipes of the second segments.

In some embodiments, the snapping block has a snapping neck and a snapping head, the snapping aperture has a first aperture portion positioned at the top of the snapping block, a second aperture portion positioned at the bottom of the snapping block and a necking passageway communicated between the first aperture portion and the second aperture portion, the first aperture portion can allow the snapping head and the snapping neck to pass therethrough, where the snapping neck forcedly passes through the necking passageway, enters into the second aperture portion and is held in the second aperture portion.

In some embodiments, the plurality of walls of the shielding cage comprise two side walls, the second segments of the two light guiding pipes are respectively assembled to inner sides of the two side walls.

In some embodiments, each side wall has a tubular snap which integrally extends toward the inside of the receiving space, the second segments of the two light guiding pipes are respectively assembled to the tubular snaps of the two side walls.

In some embodiments, the tubular snap is formed by integrally cutting a wall body of the corresponding side wall, and the tubular snap is a tubular structure which curls toward the receiving space, the tubular snap has two tube openings which are respectively positioned to an upper end and a lower end of the tubular snap and a snapping entrance which is communicated between the two tube openings, the second segment of each light guiding pipe enters into and is assembled in the tubular snap of the corresponding side wall via the snapping entrance.

In some embodiments, the second segment of each light guiding pipe has a protruding block, the protruding block can be used to abut against the lower end of the tubular snap.

In some embodiments, the top wall of the shielding cage has at least two positioning pieces and the first segment of each light guiding pipe has a positioning block which cooperates with the corresponding positioning piece.

In some embodiments, each positioning piece has a positioning recessed groove and the positioning block of each light guiding pipe of the first segment has a positioning neck which can be snapped into the positioning recessed groove.

In some embodiments, the second segments of the at least two light guiding pipes are respectively positioned at a left side and a right side of the receptacle connector and are spaced apart from each other by the receptacle connector.

The second segments of the two light guiding members of the connector assembly of the present disclosure positioned to the rear enter into the rear segment of the receiving space of the shielding cage, because the second segments of the two light guiding pipes are positioned inside the shielding cage, a space occupied by the whole connector assembly on the circuit board can be reduced. Also, the second segments of the two light guiding pipes are respectively positioned at a left side and a right side of the receptacle connector and are spaced apart from each other by the receptacle connector, interference between light sources arranged sided by side can prevented or reduced.

BRIEF DESCRIPTION OF THE DRAWINGS

Other features and technical effects of the present disclosure will be apparent in embodiments referring to the accompanying figures, in which.

DETAILED DESCRIPTION OF THE PREFERRED EMBODIMENTS

Before the present disclosure is described in detail, it should be noted that like elements are denoted by the same reference numerals in the following description.

Figure 1:
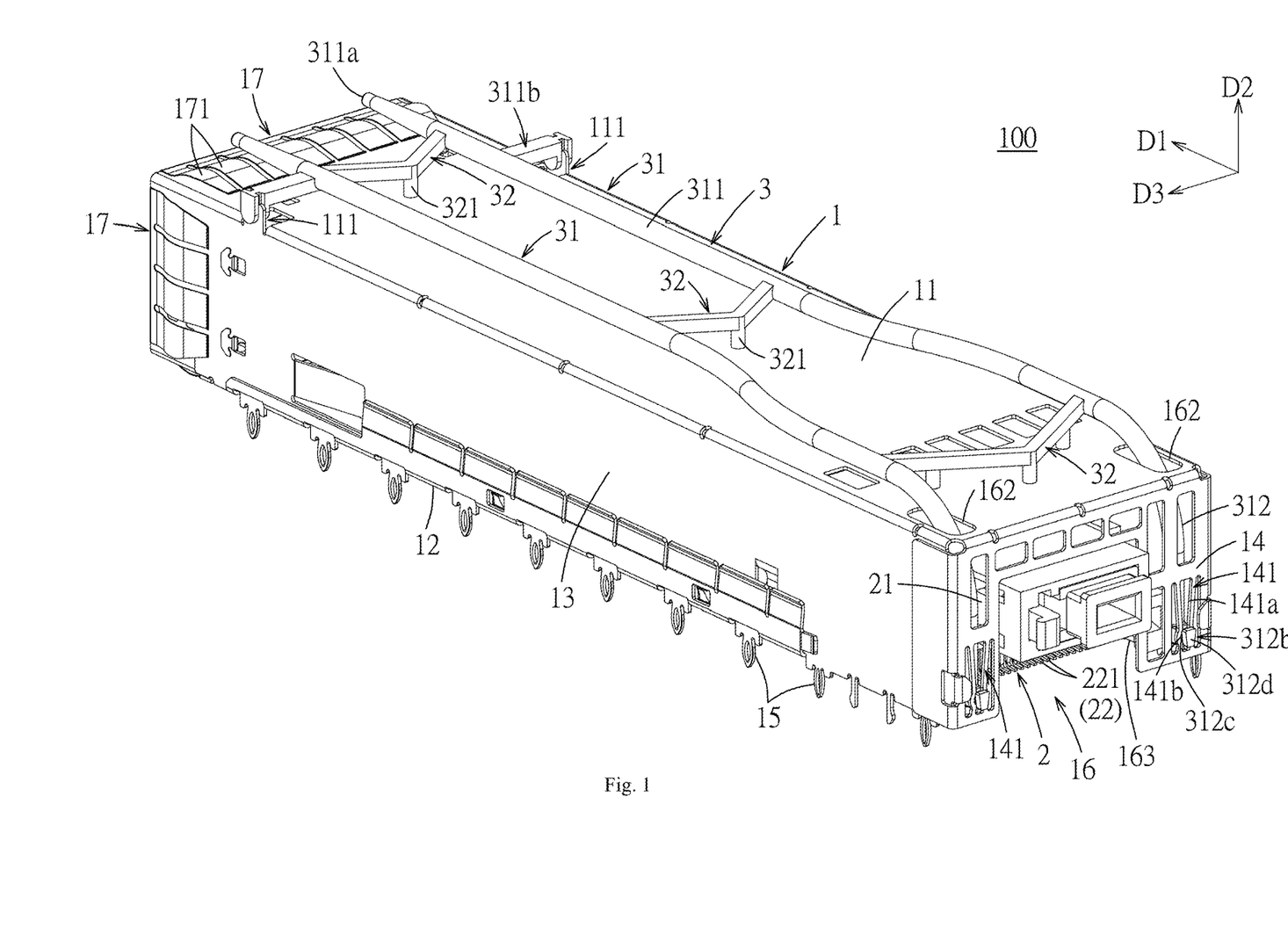
FIG. 1 is a perspective view of a first embodiment of a connector assembly of the present disclosure.
Figure 2:
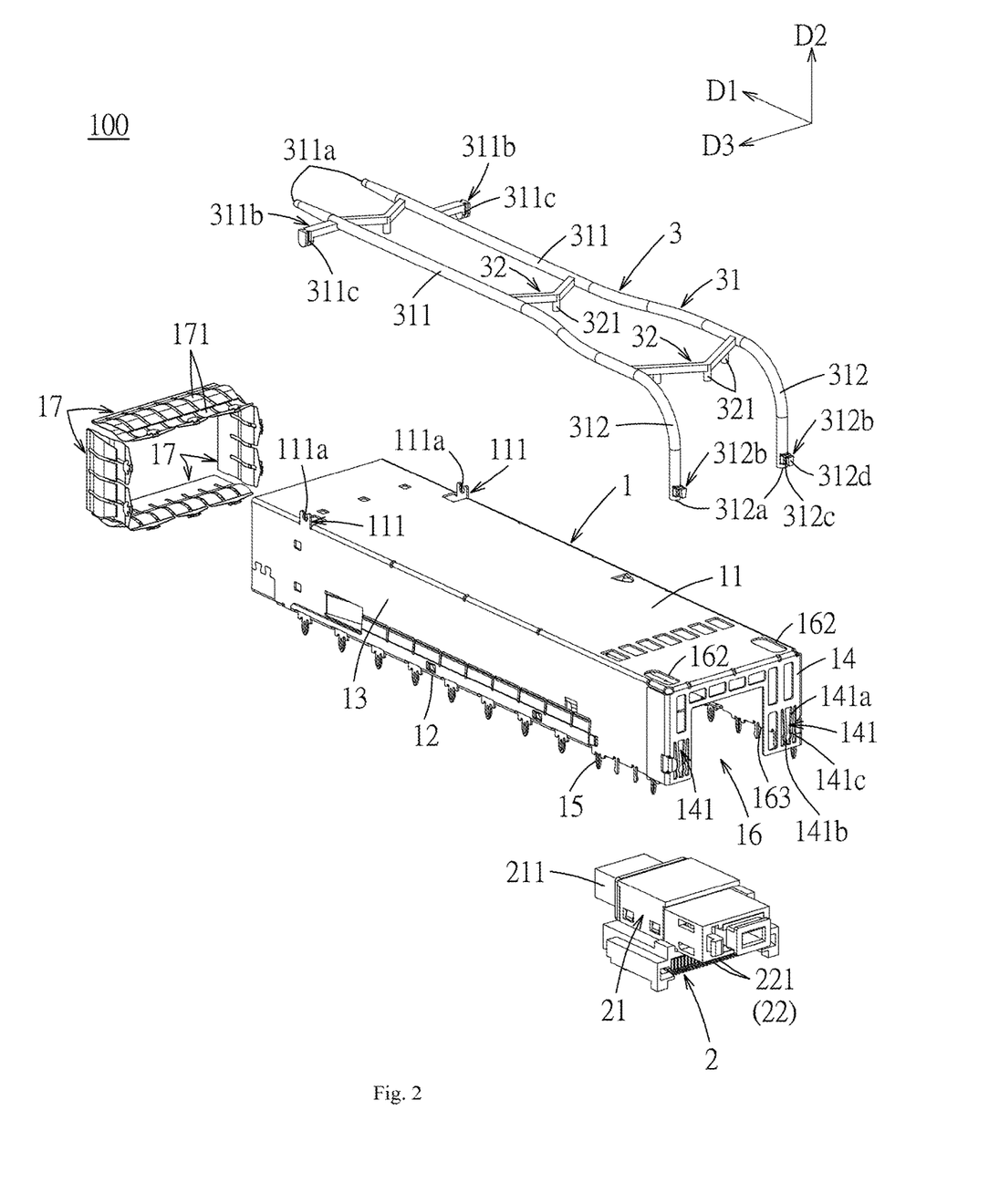
FIG. 2 is a perspective exploded view of the first embodiment of FIG. 1.
Figure 3:
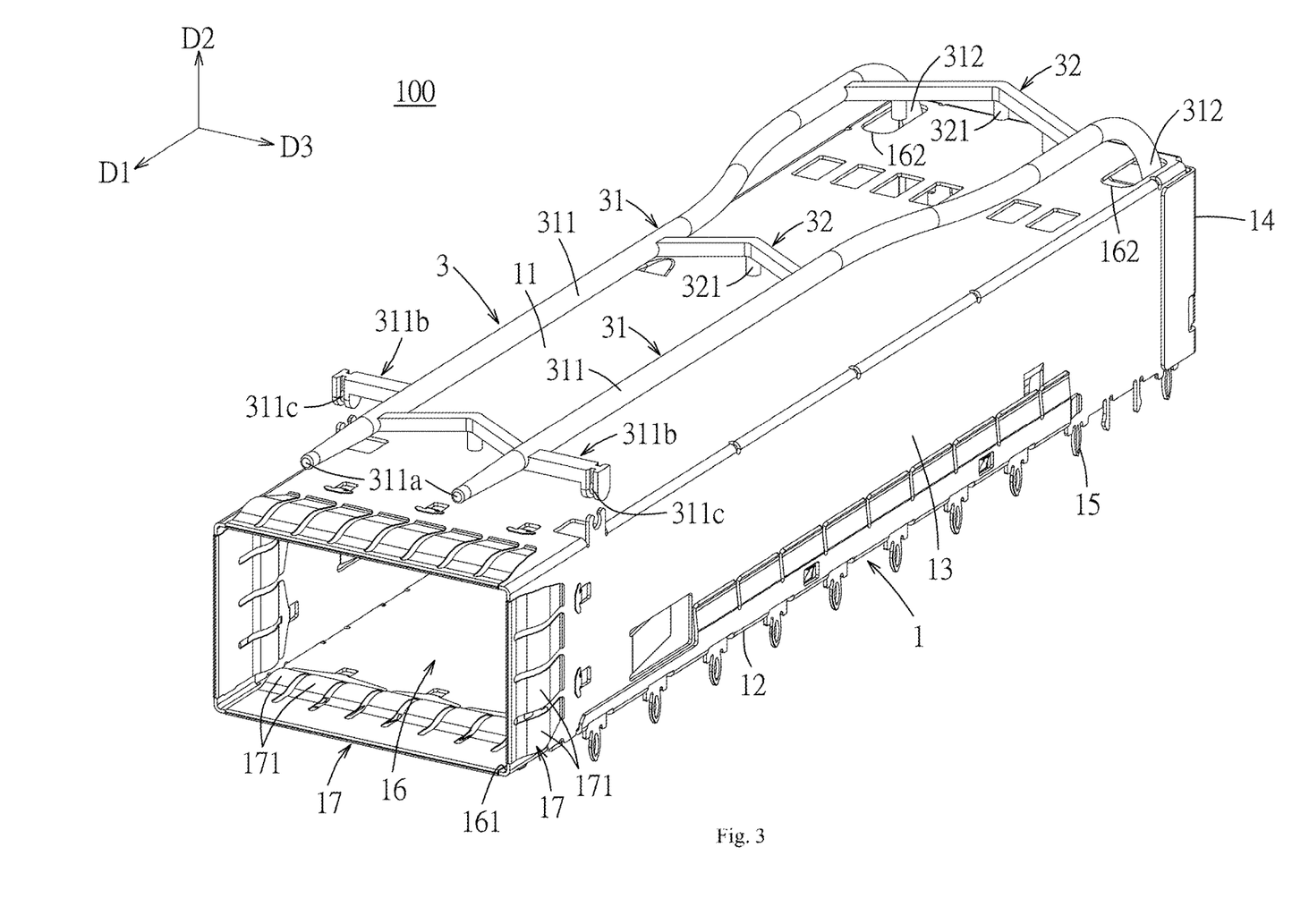
FIG. 3 is a perspective exploded view of the first embodiment of FIG. 1 from another angle.
Figure 4:
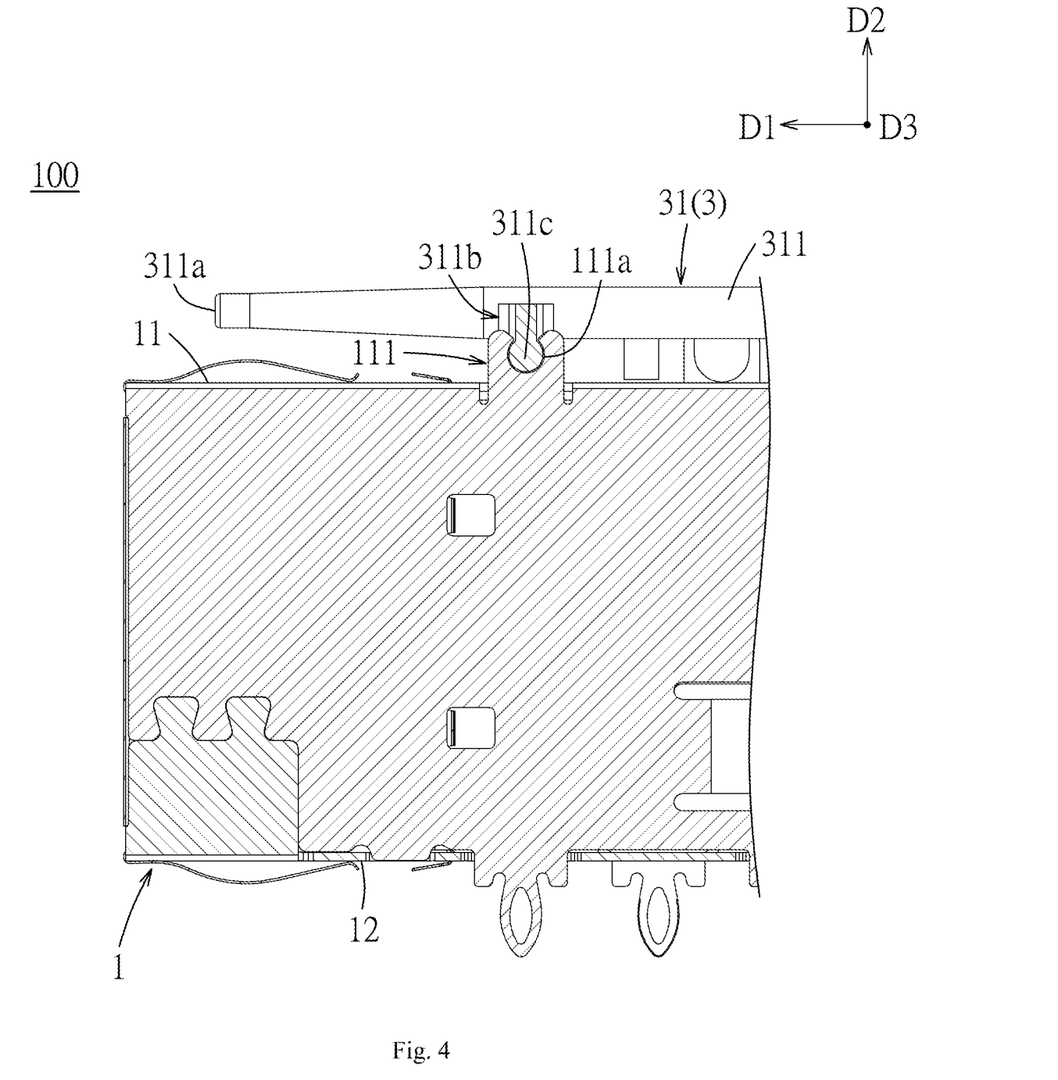
FIG. 4 is a cross sectional view of FIG. 1 for illustrating an assembling relationship between a positioning block of a light guiding member and a positioning piece of a shielding cage in the first embodiment.

Referring to FIG. 1 to FIG. 3, a first embodiment of a connector assembly 100 of the present disclosure is adapted to mate with a pluggable module (not shown). The connector assembly 100 includes a shielding cage 1, a receptacle connector 2 and a light guiding member 3. It is noted that, the shielding cage 1, the receptacle connector 2 and the light guiding member 3 may be adjusted in number as desired and may be a stacked or combined construction, are not limited to the first embodiment in number.

The shielding cage 1, for example, may be a metal material. The shielding cage 1 may be formed by processing a metal plate, such as stamping and bending, with a die. The shielding cage 1 extends along a front-rear direction D1 (a direction to which an arrow points is front, and an opposite direction is rear) and has a top wall 11, and a bottom wall 12 which is spaced apart from and faces the top wall 11 along an up-down direction D2 (a direction to which an arrow points is up, and an opposite direction is down), two side walls 13 which are spaced apart from each other and face each other along a left-right direction D3 (a direction to which an arrow points is right, and an opposite direction is right) and are respectively connected to two sides of the top wall 11 and the bottom wall 12, a rear wall 14 which is positioned at a rear end of the shielding cage 1 and is connected to a rear edge of the top wall 11 and rear edges of the two side walls 13, and a plurality of insertion legs 15 which extend downwardly from the two side walls 13 and are adapted to be fixed in insertion holes (not shown) of a circuit board (not shown) and/or be connected to ground traces. In addition, the shielding cage 1 further has a receiving space 16 which is defined together by the top wall 11, the bottom wall 12, the two side walls 13 and the rear wall 14 and is positioned inside the shielding cage 1, a front end opening 161 which is positioned at a front end of the shielding cage 1, is communicated to the receiving space 16 and allows the pluggable module to insert therein, two apertures 162 which are formed to a rear end of the top wall 11 and are communicated to the receiving space 16, and a bottom opening 163 which is positioned behind the bottom wall 12 and is communicated to the receiving space 16.

The receptacle connector 2 is received in a rear segment of the receiving space 16 of the shielding cage 1 via the bottom opening 163 so that the receptacle connector 2 is covered by the shielding cage 1. In addition, the receptacle connector 2 is mechanically and electrically provided to the circuit board, the receptacle connector 2 has a housing 21 which is insulative and terminals 22. The housing 21 has a mating portion 211 which is towards the front, the terminals 22 are provided in the mating portion 211 and allow tail portions 221 of the terminals 22 to be electrically and mechanically connected to the circuit board. When the pluggable module enters into the shielding cage 1 via the front end opening 161, a mating board (not shown) of the pluggable module can be inserted into the mating portion 211 of the receptacle connector 2, so that the mating board contacts the terminals 22 in the mating portion 211 of the receptacle connector 2, and in turn the pluggable module and the receptacle connector 2 of the connector assembly 100 mate with each other. Moreover, a plurality of grounding members 17 are provided at the front end opening 161 of the shielding cage 1, the plurality of grounding members 17 have a plurality of elastic fingers 171 which extend rearwardly from a position of the shielding cage 1 where the front end opening 161 is present and are distributed to an outer side of the shielding cage 1 and an inner side of the shielding cage 1, in the plurality of elastic fingers 171, the elastic finger 171 positioned at the outer side of the shielding cage 1 is used to contact a part of a casing (not shown) which is positioned at a circumferential edge of a mounting hole (not shown), the elastic finger 171 is positioned at the inner side of the shielding cage 1 is used to contact the pluggable module.

The light guiding member 3 has two light guiding pipes 31 and a plurality of connecting posts 32 connected to the two light guiding pipes 31. Each light guiding pipe 31 has a first segment 311 which is positioned at the front and extends from the front to the rear and a second segment 312 which is positioned at the rear and extends from the top to the bottom. The first segments 311 of the two light guiding pipes 31 are positioned outside the shielding cage 1 above the top wall 11 of the shielding cage 1 and close to two sides of the top wall 11 of the shielding cage 1 respectively and are assembled to the top wall 11. The second segments 312 of the two light guiding pipes 31, respectively, pass through the two apertures 162 in the top wall 11, enter into the rear segment of the receiving space 16 of the shielding cage 1, and are assembled to the rear wall 14, the second segments 312 of the two light guiding pipes 31 and are respectively positioned at a left side and a right side of the receptacle connector 2 and spaced apart from each other by the receptacle connector 2. The first segment 311 has a light exiting end 311a positioned at a front end of the first segment 311, the second segment 312 has a light entering end 312a which is positioned at a bottom end of the second segment 312 and faces light emitting member (not shown) on the circuit board. Because the second segments 312 of the two light guiding pipes 31 are positioned inside the shielding cage 1, a space occupied by the whole connector assembly 100 on the circuit board can be reduced. Also, the second segments 312 of the two light guiding pipes 31 are respectively positioned at the left side and the right side of the receptacle connector 2 respectively and are spaced apart from each other by the receptacle connector 2, interference between light sources arranged sided by side (light beams from the light emitting members and light beams leaked out between the light emitting members and the light entering ends 312a of the two light guiding pipes 31) can be prevented or reduced.

It is noted that, the aperture 162 may be only one in number in a varied embodiment, in this varied embodiment, the second segments 312 of the two light guiding pipes 31 together pass through one elongated aperture and enter into the rear segment of the receiving space 16 of the shielding cage 1. In other embodiments, the light guiding pipe 31 of the light guiding member 3 also may be three or more in number, and the aperture 162 also may correspond to the light guiding pipe 31 of the light guiding member 3 in number and also may be adjusted to be three or more in number, which is not limited to the first embodiment.

Referring to FIGS. 1 to 4, in the first embodiment, the top wall 11 of the shielding cage 1 has two positioning pieces 111 which extend upwardly from a left side and a right side of a front segment of the top wall 11 respectively and respectively correspond to the two light guiding pipes 31 of the light guiding member 3. The first segment 311 of each light guiding pipe 31 has a positioning block 311b which extends outwardly and cooperates with the corresponding positioning piece 111. Each positioning piece 111 has a positioning recessed groove 111a which is opened upwardly, the positioning block 311b of the first segment 311 of each light guiding pipe 31 has a positioning neck 311c which is positioned near a tip end of the positioning block 311b and can be snapped into the positioning recessed groove 111a.

Figure 5:
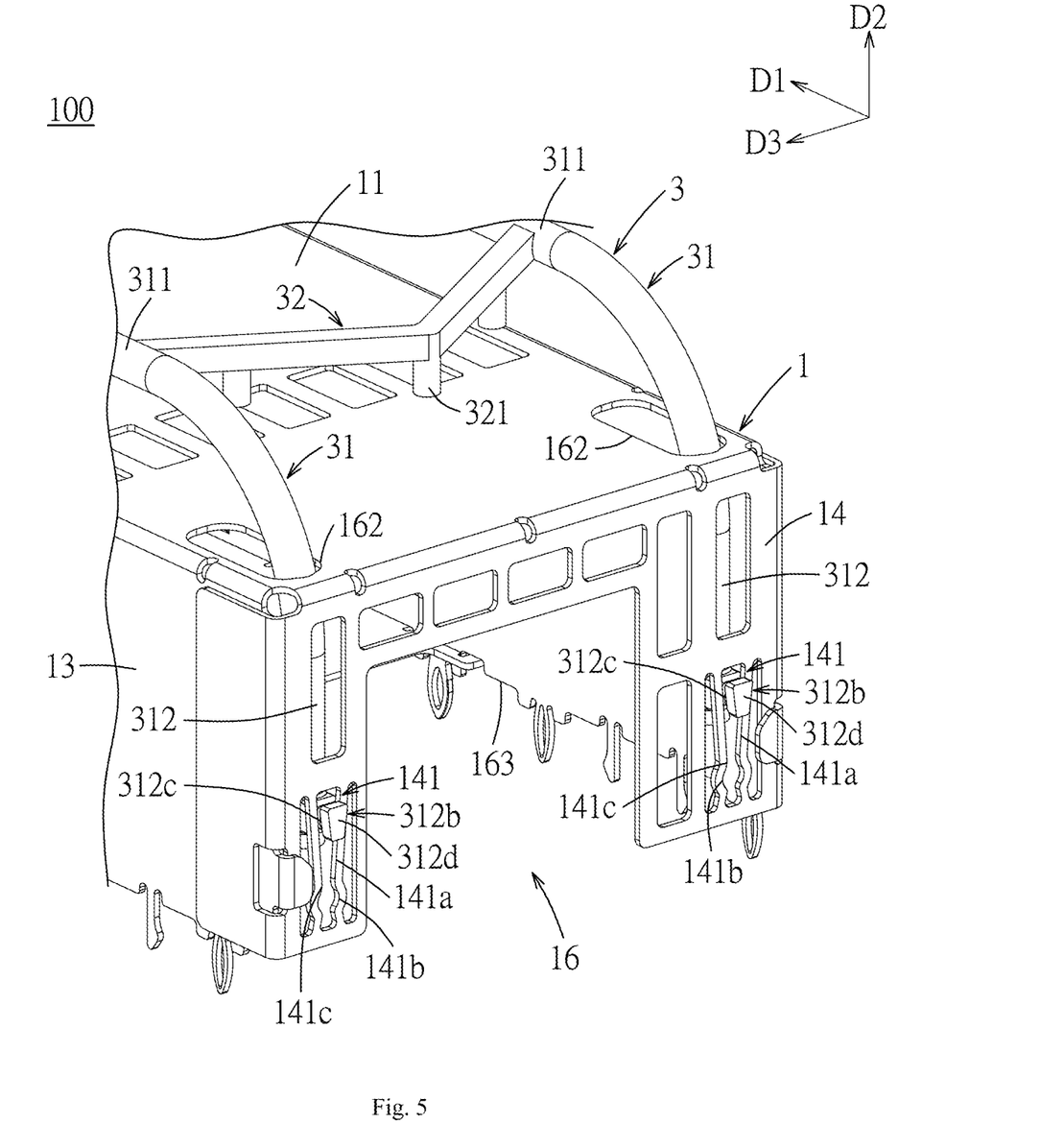
FIG. 5 is a partial perspective exploded view of the first embodiment in which the light guiding member of the first embodiment has not been completely assembled to the shielding cage.
Figure 6:
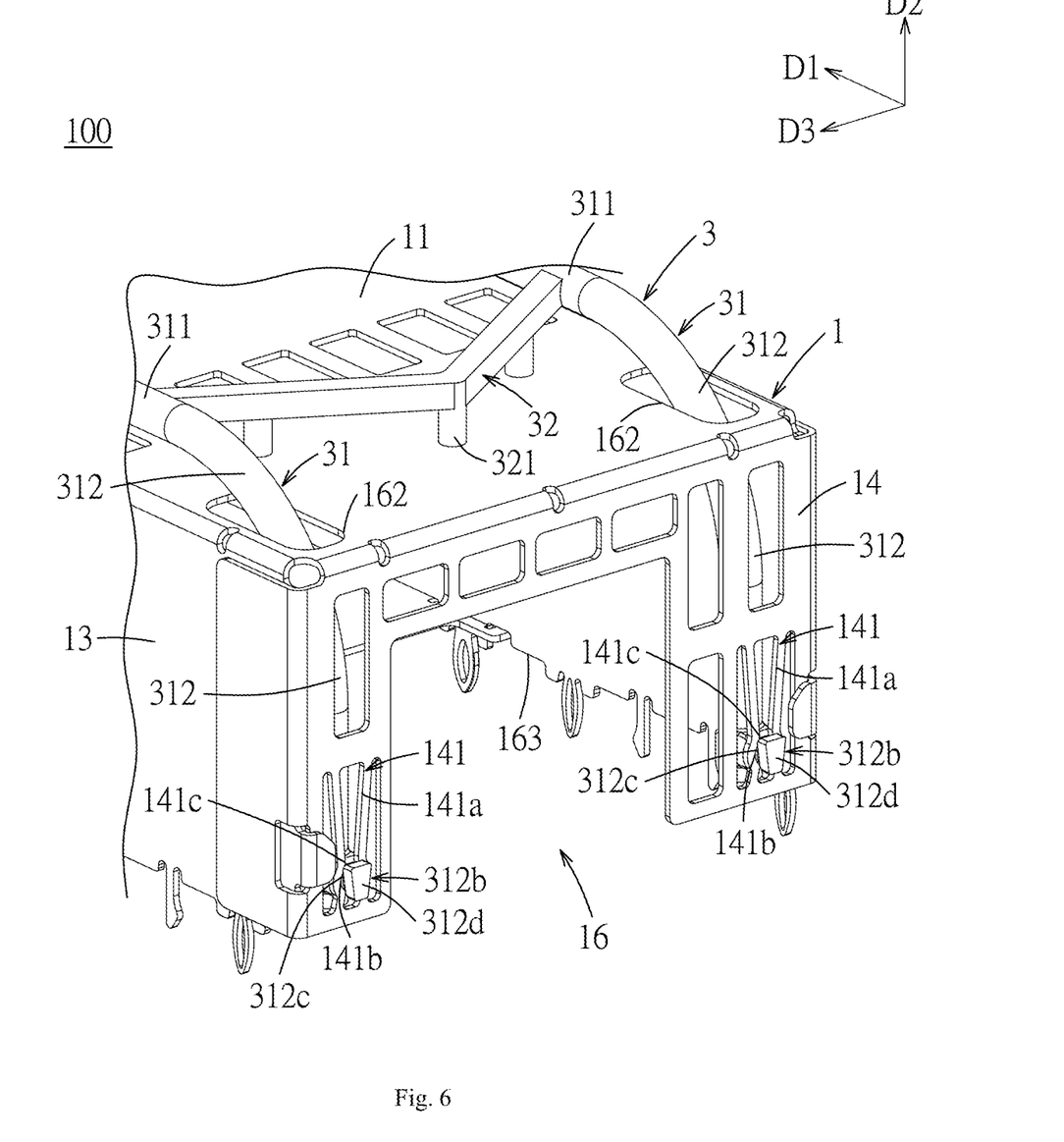
FIG. 6 is a partial perspective view of the first embodiment in which the light guiding member of the first embodiment has been completely assembled to the shielding cage.
Figure 7:
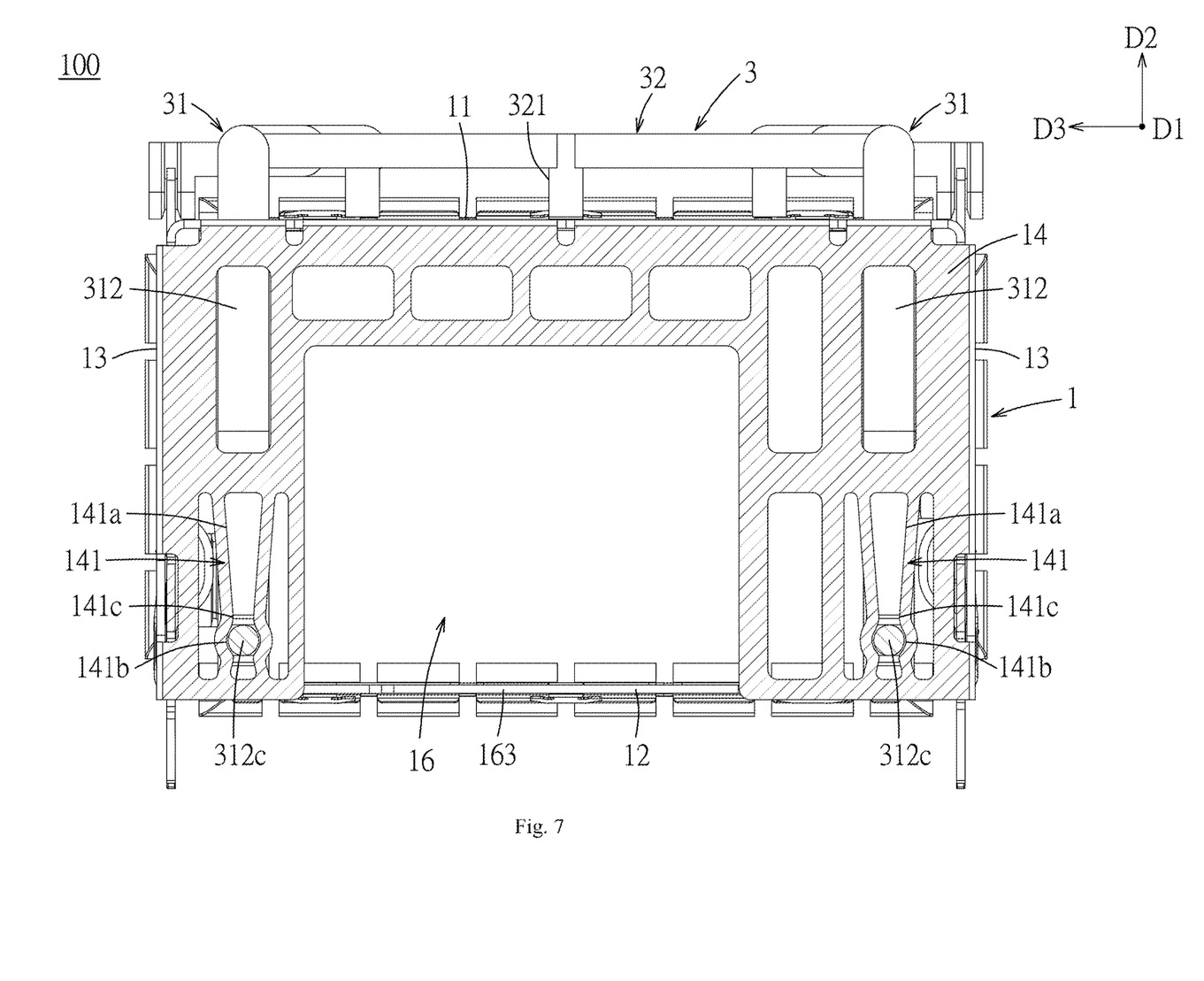
FIG. 7 is a cross sectional view of FIG. 1 for illustrating an assembling relationship between a snapping block of the light guiding member and a snapping aperture of the shielding cage in the first embodiment.

Referring to FIGS. 1 to 2 and FIGS. 5 to 7, the second segment 312 of each light guiding pipe 31 has a snapping block 312b which extends rearwardly. The rear wall 14 has two snapping apertures 141 which correspondingly cooperate with the snapping blocks 312b of the two light guiding pipes 31 of the second segments 312 respectively. The snapping block 312b has a snapping neck 312c and a snapping head 312d connected to a rear end of the snapping neck 312c. Each snapping aperture 141 has a first aperture portion 141a positioned to the up, a second aperture portion 141b positioned to the bottom and a necking passageway 141c communicated between the first aperture portion 141a and the second aperture portion 141b. In an assembling process, the first aperture portion 141a can allow the snapping head 312d and the snapping neck 312c to pass through, after the snapping neck 312c passes through the first aperture portion 141a (as shown in FIG. 5), then the second segment 312 of the light guiding pipe 31 is pressed down to force the snapping neck 312c to pass through the necking passageway 141c, and the snapping neck 312c enters into the second aperture portion 141b and is held in the second aperture portion 141b (as shown in FIG. 6). In addition, when assembled, it may be that firstly the second segment 312 is assembled to the snapping aperture 141 of the rear wall 14, and the first segment 311 is assembled to the positioning piece 111 of the top wall 11. Moreover, in the first embodiment, the plurality of connecting posts 32 are connected between the first segments 311 of the two light guiding pipes 31, and each connecting post 32 of the light guiding member 3 further has a supporting protrusion 321 which extends downwardly and abuts against the top wall 11, the supporting protrusion 321 makes the first segments 311 of the two light guiding pipes 31 maintain a constant distance from the top wall 11.

Figure 8:
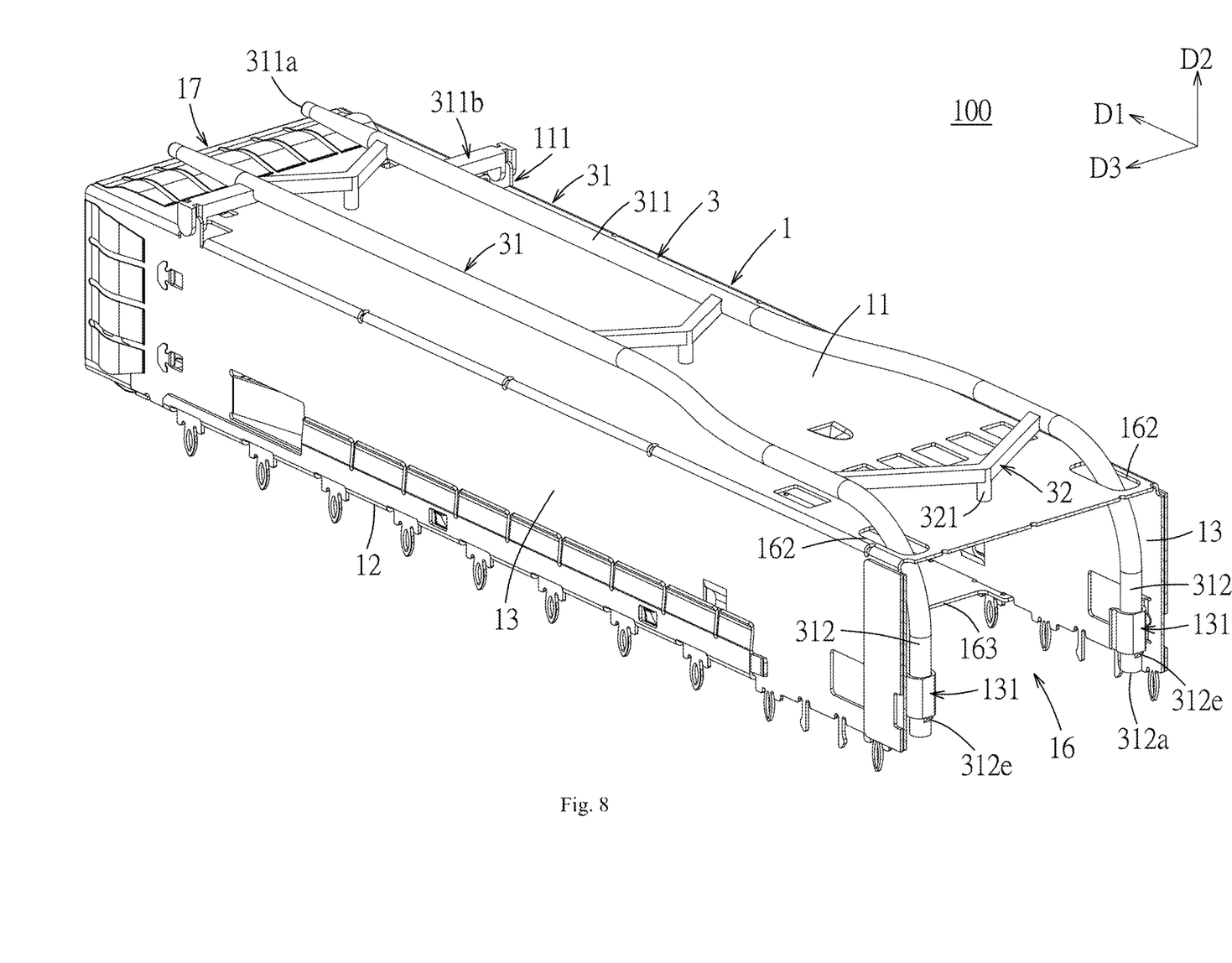
FIG. 8 is a perspective view of a second embodiment of the connector assembly of the present disclosure in which a part of a shielding cage of the second embodiment is cut away.
Figure 9:
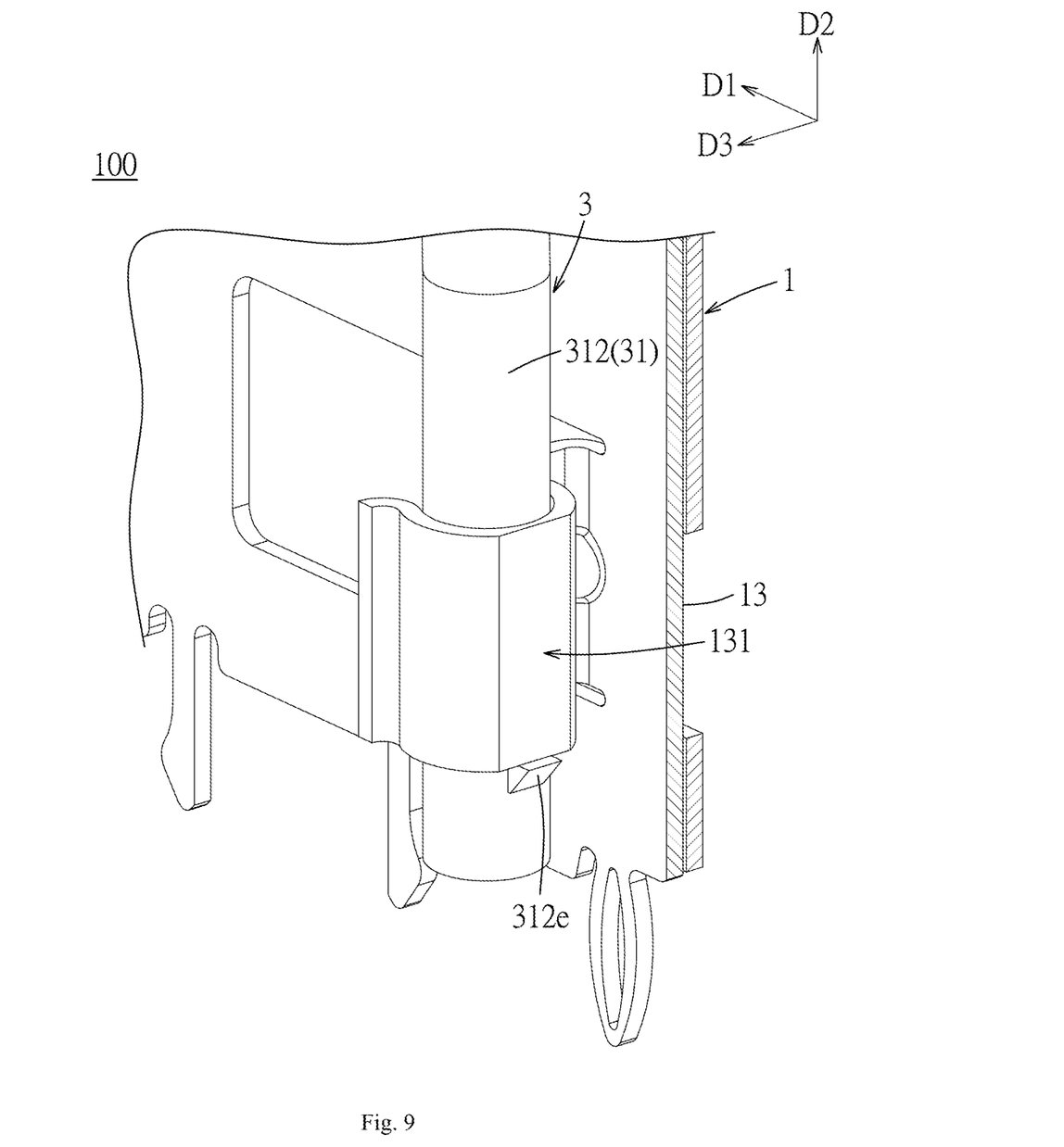
FIG. 9 is a partial perspective view of the second embodiment of FIG. 8.
Figure 10:
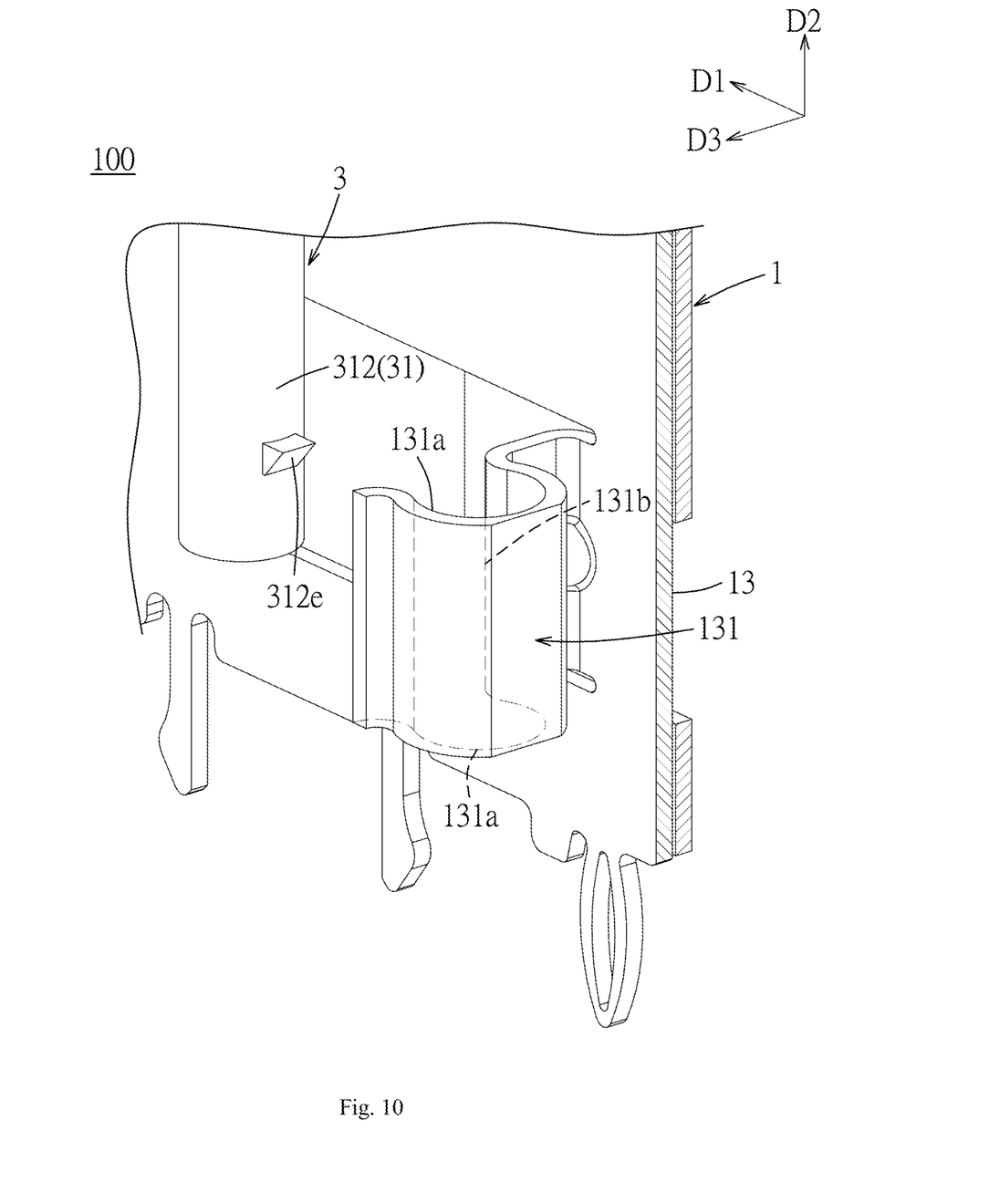
FIG. 10 is a partial perspective exploded view of the second embodiment of FIG. 9 in which a light guiding pipe of a light guiding member of the second embodiment is not assembled to the shielding cage.
Figure 11:
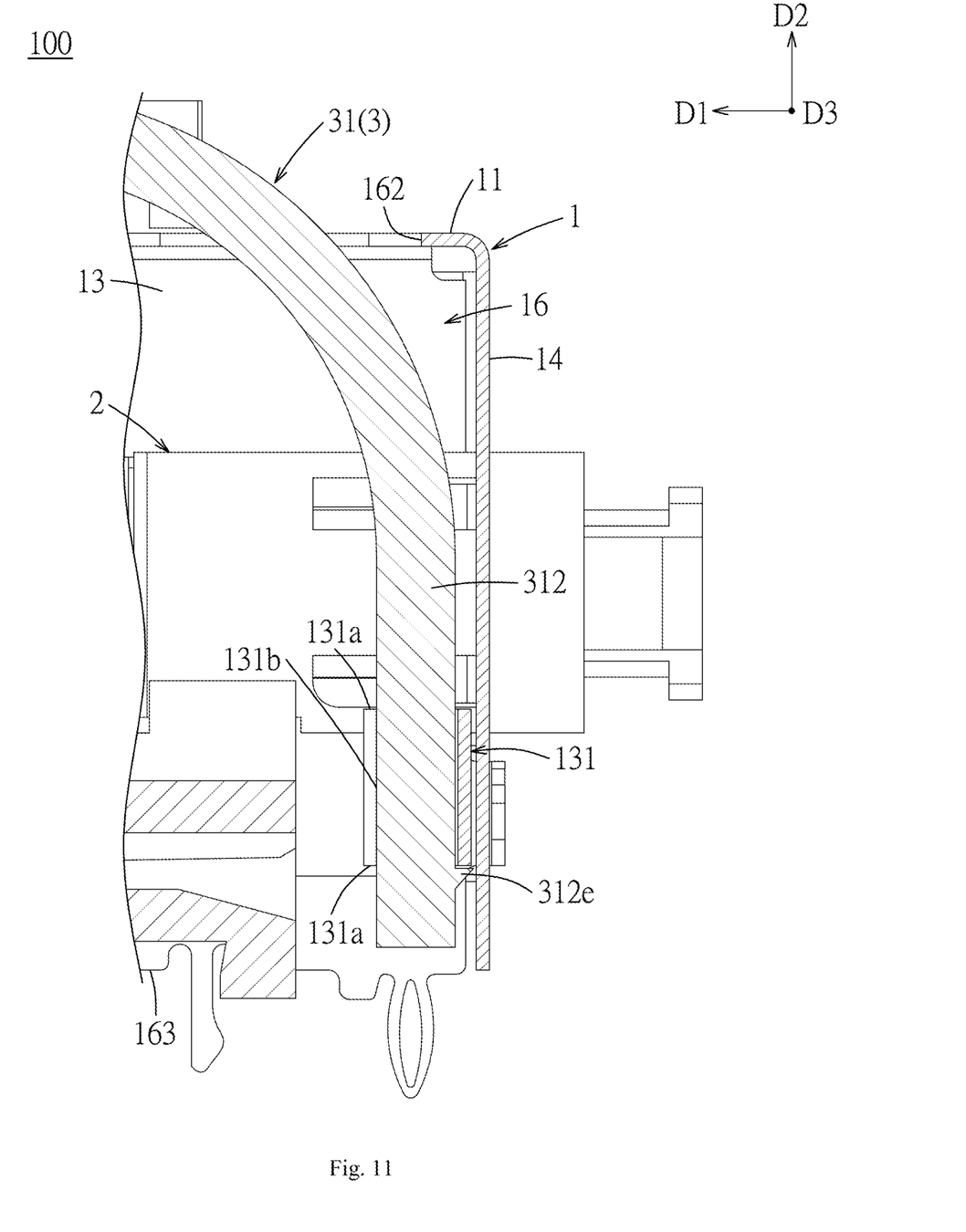
FIG. 11 is a partial cross sectional view of the second embodiment for illustrating an assembling relationship between the light guiding pipe of the light guiding member of the second embodiment and a tubular snap of the shielding cage.

Referring to FIGS. 8 and 11, a second embodiment of the connector assembly 100 of the present disclosure differs from the first embodiment in that, the second segments 312 of the two light guiding pipes 31 are respectively assembled to inner sides of the two side walls 13, each side wall 13 has a tubular snap 131 which integrally extends toward the inside of the receiving space 16, the second segments 312 of the two light guiding pipes 31 are respectively assembled in the tubular snaps 131 of the two side walls 13. For example, each tubular snap 131 is formed by integrally cutting a wall body of the corresponding side wall 13, and the tubular snap 131 is a tubular structure which curls toward the receiving space 16 and approaches to the rear wall 14. Each tubular snap 131 has two tube openings 131a which are respectively positioned at an upper end and a lower end of the tubular snap 131 and a snapping entrance 131b which is communicated between the two tube openings 131a and is opened forwardly, the second segment 312 of each light guiding pipe 31 rearwardly enters into and is assembled into the tubular snap 131 of the corresponding side wall 13 via the snapping entrance 131b. And, in the second embodiment, the second segment 312 of each light guiding pipe 31 has a protruding block 312e, the protruding block 312e can be used to abut against the lower end of the tubular snap 131, so as to strengthen positioning of the light guiding pipe 31 relative to the shielding cage 1 in the up-down direction D2.

In conclusion, the second segments 312 of the two light guiding members 3 of the connector assembly 100 of the present disclosure are positioned to the rear and enter into the rear segment of the receiving space 16 of the shielding cage 1. Since the second segments 312 of the two light guiding pipes 31 are positioned inside the shielding cage 1, a space occupied by the whole connector assembly 100 on the circuit board can be reduced. Also, the second segments 312 of the two light guiding pipes 31 are respectively positioned on a left side and a right side of the receptacle connector 2 and are spaced apart from each other by the receptacle connector 2, interference between light sources arranged sided by side can prevented or reduced.

The above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. A connector assembly, comprising:
   a shielding cage having a plurality of walls, a receiving space defined together by the plurality of walls and extending from a front to a rear of the shielding cage, a front end opening communicated to the receiving space and an aperture communicated to the receiving space;

a receptacle connector received in a rear segment of the receiving space of the shielding cage; and a light guiding member having at least two light guiding pipes, each light guiding pipe having a first segment positioned to the front and a second segment positioned to the rear, wherein the first segments of the two light guiding pipes are positioned outside the shielding cage, and wherein the second segments of the two light guiding pipes are passing through the aperture and entering into the rear segment of the receiving space of the shielding cage.

2. The connector assembly of claim 1, wherein the first segment of each light guiding pipe extends from the front to the rear, and each light guiding pipe of the second segment extends from a top of the shielding cage to a bottom of the shielding cage, wherein the plurality of walls of the shielding cage comprise a top wall and the aperture is formed to a rear end of the top wall, and wherein the first segments of the two light guiding pipes are positioned above the top wall of the shielding cage close to two sides of the top wall and the second segments of the two light guiding pipes pass through the aperture in the top wall and enter into the rear segment of the receiving space of the shielding cage.

3. The connector assembly of claim 2, wherein the plurality of walls of the shielding cage comprise a rear wall, and wherein the second segments of the two light guiding pipes are assembled to the rear wall.

4. The connector assembly of claim 3, wherein the second segment of each light guiding pipe has a snapping block, and wherein the rear wall has snapping apertures which correspondingly cooperate with the snapping blocks of the two light guiding pipes of the second segments.

5. The connector assembly of claim 4, wherein the snapping block has a snapping neck and a snapping head, and wherein the snapping aperture has a first aperture portion, a second aperture portion, and a necking passageway communicated between the first aperture portion and the second aperture portion, the first aperture portion can allow the snapping head and the snapping neck to pass therethrough, and wherein the snapping neck forcedly passes through the necking passageway and enters into the second aperture portion and is held in the second aperture portion.

6. The connector assembly of claim 2, wherein the plurality of walls of the shielding cage comprise two side walls, and wherein the second segments of the two light guiding pipes are respectively assembled to inner sides of the two side walls.

7. The connector assembly of claim 6, wherein each side wall has a tubular snap which integrally extends toward an inside of the receiving space, and wherein the second segments of the two light guiding pipes are respectively assembled to the tubular snaps of the two side walls.

8. The connector assembly of claim 7, wherein the tubular snap is formed by integrally cutting a wall body of the corresponding side wall, wherein the tubular snap is a tubular structure which curls toward the receiving space, wherein the tubular snap has two tube openings which are respectively positioned to an upper end and a lower end of the tubular snap and a snapping entrance which is communicated between the two tube openings, and wherein the second segment of each light guiding pipe enters into and is assembled in the tubular snap of the corresponding side wall via the snapping entrance.

9. The connector assembly of claim 8, wherein the second segment of each light guiding pipe has a protruding block, the protruding block can be used to abut against the lower end of the tubular snap.

10. The connector assembly of claim 2, wherein the top wall of the shielding cage has at least two positioning pieces, and wherein the first segment of each light guiding pipe has a positioning block which cooperates with the corresponding positioning piece.

11. The connector assembly of claim 10, wherein each positioning piece has a positioning recessed groove, and wherein the positioning block of each light guiding pipe of the first segment has a positioning neck which can be snapped into the positioning recessed groove.

12. The connector assembly of claim 1, wherein the second segments of the at least two light guiding pipes are respectively positioned at a left side and a right side of the receptacle connector and are spaced apart from each other by the receptacle connector.

13. A connector assembly, comprising:

a shielding cage having a receiving space defined by a plurality of walls, the receiving space extending from a front to a rear of the shielding cage, an aperture through the shielding cage and communicated to the receiving space;

a receptacle connector in a rear segment of the receiving space of the shielding cage; and a light guiding pipe having a first segment positioned to the front and a second segment positioned to the rear, wherein the first segment is positioned outside the shielding cage, and the second segment passes through the aperture and enters into the rear segment of the receiving space.

14. The connector assembly of claim 13, wherein the first segment of the light guiding pipe extends from the front to the rear, and the second segment extends from a top of the shielding cage to a bottom of the shielding cage.

15. The connector assembly of claim 13, wherein the plurality of walls of the shielding cage comprise a top wall and the aperture is formed to a rear end of the top wall.

16. The connector assembly of claim 13, wherein the plurality of walls of the shielding cage comprise a rear wall, and the second segment of the light guiding pipe is assembled to the rear wall.

17. The connector assembly of claim 16, wherein the second segment of the light guiding pipe has a snapping block, and the rear wall has a snapping aperture which correspondingly cooperates with the snapping block.

18. The connector assembly of claim 17, wherein the snapping block has a snapping neck and a snapping head, and the snapping aperture has a first aperture portion, a second aperture portion, and a necking passageway communicated between the first aperture portion and the second aperture portion, the first aperture portion can allow the snapping head and the snapping neck to pass therethrough, and wherein the snapping neck forcedly passes through the necking passageway and enters into the second aperture portion and is held in the second aperture portion.

19. The connector assembly of claim 13, wherein the plurality of walls of the shielding cage comprise a side wall, and the second segment of the light guiding pipe is assembled to an inner side of the side wall.

20. The connector assembly of claim 19, wherein the side wall has a tubular snap which integrally extends toward an inside of the receiving space, and the second segment of the light guiding pipe is assembled to the tubular snap.

\* \* \* \* \*